United States Patent [19]

De Coi

[11] Patent Number: 4,896,606
[45] Date of Patent: Jan. 30, 1990

[54] OPTICAL PROXIMITY FUZE

[75] Inventor: Beat De Coi, Landquart, Switzerland

[73] Assignee: Werkzeugmaschinenfabrik Oerlikon-Bührle AG, Zürich, Switzerland

[21] Appl. No.: 325,958

[22] Filed: Mar. 20, 1989

[30] Foreign Application Priority Data

Mar. 31, 1988 [CH] Switzerland .............................. 01 226

[51] Int. Cl.$^4$ ............................................. F42C 13/02
[52] U.S. Cl. .................................................. 102/213
[58] Field of Search ......................................... 102/213

[56] References Cited

U.S. PATENT DOCUMENTS

| | | | |
|---|---|---|---|
| 3,554,129 | 1/1971 | Alpers | 102/213 |
| 3,749,918 | 7/1973 | Jones | 250/208 |
| 4,306,500 | 12/1981 | Castanien | 102/213 |
| 4,409,900 | 10/1983 | Currie | 102/213 |
| 4,709,142 | 11/1987 | Dahl | 250/221 |

FOREIGN PATENT DOCUMENTS

| | | |
|---|---|---|
| 0208050 | 1/1987 | European Pat. Off. . |
| 2949521 | 10/1982 | Fed. Rep. of Germany . |
| 3429943 | 5/1985 | Fed. Rep. of Germany . |
| 3627972 | 2/1988 | Fed. Rep. of Germany . |

OTHER PUBLICATIONS

Patent Abstracts of Japan, Band 1, Nr. 39, (2359) (M-76), Apr. 20, 1977 and JP, A, 51-145200 (Boeicho Gijutsuhonbu), Dec. 13, 1976.

Primary Examiner—Charles T. Jordan
Attorney, Agent, or Firm—Werner W. Kleeman

[57] ABSTRACT

An optical proximity fuze for detonating the associated projectile or missile at a desired distance from a target is extremely sensitive to interfering effects, for example, to rain drops which simulate a target which is non-existent. To minimize the probability of the optical proximity fuze responding in undesired manner to rain drops and thus to reduce the danger of premature detonation of the projectile or missile due to interfering effects, the optical proximity fuze comprises at least two optical transmitters at each of which there is arranged at least one respective optical receiver. The target distance is simultaneously measured by the at least two optical receivers in several chronological measurements. Detonation is only accomplished when the at least two receivers simultaneously respond.

3 Claims, 4 Drawing Sheets

OPTICAL PROXIMITY FUZE

BACKGROUND OF THE INVENTION

The present invention broadly relates to a device or apparatus for target detection and pertains more specifically to an optical proximity fuze for detonating a projectile or missile or the like at a desired or predeterminate distance from a target.

Generally speaking, the optical proximity fuze of the present invention is of the type comprising at least one optical transmitter or sender and at least one optical receiver or detector upon which the beam emitted by the at least one transmitter or sender and reflected at the target impinges. Upon reception of the reflected beam, the at least one optical receiver delivers a signal for detonating the projectile or missile or the like.

Such proximity fuzes are known, for example, from West German Published Pat. Application No. 3,429,943, published May 9, 1985, and West German Pat. No. 2,949,521, published October 21, 1982. The known proximity fuzes described therein comprise means for eliminating interfering or spurious effects due to stray light or noise. Apart from or in addition to such interfering effects or spurious signals caused by stray light or noise, especially sunlight, there are, however, still other disturbing or interfering or spurious effects which cannot be eliminated by the known means, for example, in the case of solid particles in the atmosphere or rain drops which reflect the emitted beam and simulate a target which is non-existent.

SUMMARY OF THE INVENTION

Therefore, with the foregoing in mind, it is a primary object of the present invention to provide a new and improved construction of an optical proximity fuze which does not exhibit the aforementioned drawbacks and shortcomings of the prior art.

Another and more specific object of the present invention aims at providing a new and improved construction of an optical proximity fuze of the previously mentioned type which minimizes the probability or likelihood that the optical proximity fuze responds to rain drops or smaller solid particles.

Yet a further significant object of the present invention aims at providing a new and improved construction of a fuze of the character described which is relatively simple in construction and design, extremely economical to manufacture, highly reliable in operation and not readily subject to malfunction.

Now in order to implement these and still further objects of the invention, which will become more readily apparent as the description proceeds, the optical proximity fuze of the present invention is manifested, among other things, by the features that for reducing the danger or hazard of premature detonation of the projectile or missile due to interfering or spurious effects, there are provided at least two optical transmitters or senders at each of which there is arranged a respective optical receiver or detector. The target distance is simultaneously measured by the at least two optical receivers or detectors in several chronological or timewise measurements such that detonation is only accomplished when the at least two receivers or detectors essentially simultaneously respond.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
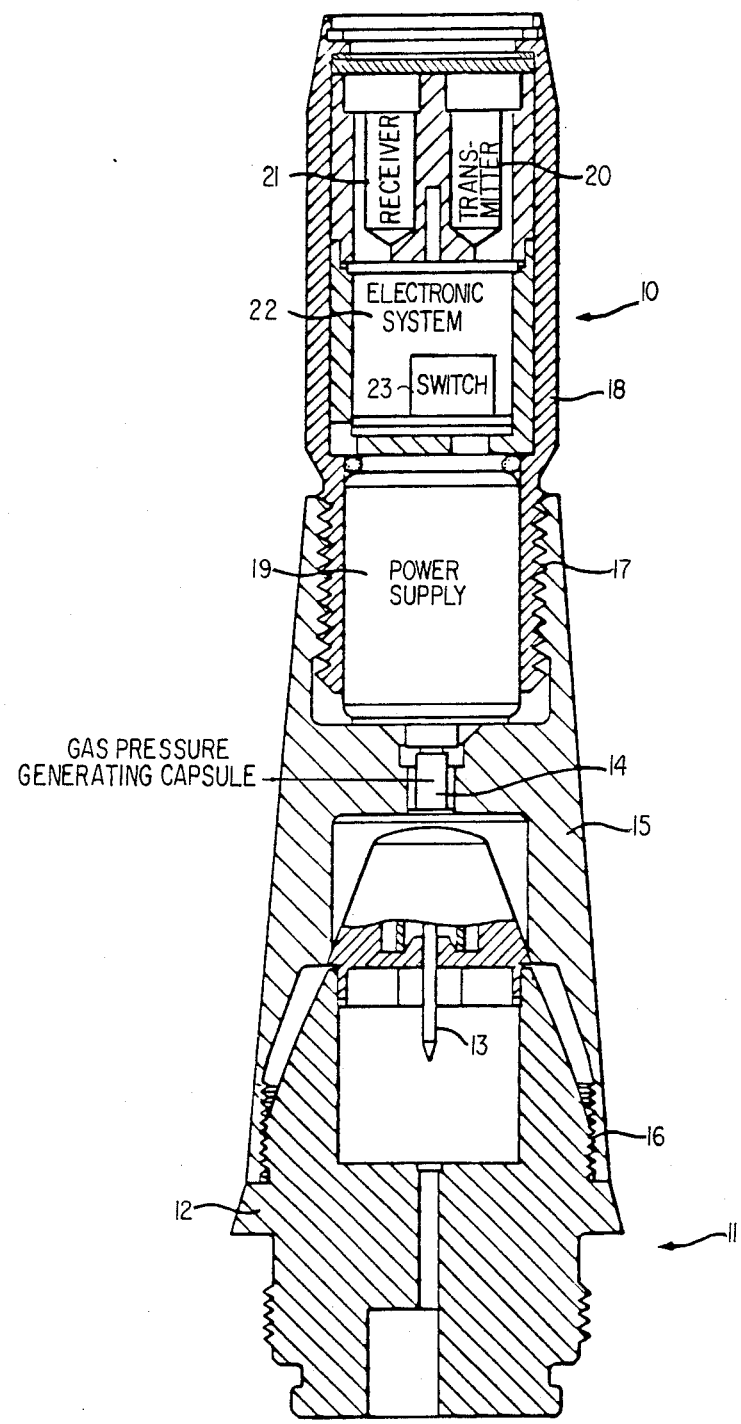
FIG. 1 is a schematic longitudinal sectional view of an optical proximity fuze which is mounted on a mortar fuze and constructed according to the invention.

Describing now the drawings, it is to be understood that to simplify the showing thereof, only enough of the structure of the optical proximity fuze has been illustrated therein as is needed to enable one skilled in the art to readily understand the underlying principles and concepts of the present invention. Turning attention now specifically to FIG. 1 of the drawings, an optical proximity fuze 10 illustrated therein by way of example and not limitation will be seen to be screwed or threaded on to a mortar fuze 11. The mortar fuze 11 comprises a housing 12 which is screwed or threaded on to a projectile or mortar shell or the like not particularly shown in the drawings. Of this mortar fuze 11, there is only shown an ignition or firing pin 13 which serves to prime a primer capsule or pellet not particularly shown in the drawings. In case the optical proximity fuze 10 is not screwed or threaded on to the mortar fuze 11, this ignition or firing pin 13 is pushed back when the projectile or mortar shell or the like strikes the target and can thus prime the primer capsule or pellet. On the other hand, if the optical proximity fuze 10 is screwed or threaded on to the mortar fuze 11, then the ignition or firing pin 13 is actuated by a gas-pressure generating capsule 14 as soon as the projectile or missile or the like is at the desired or predetermined distance from the target. This gas-pressure generating capsule 14 is located in an intermediate piece or part 15 which at the rear end thereof is screwed or threaded on to the housing 12 of the mortar fuze 11 by means of a thread or threading 16, and at the front end thereof to a housing 18 of the optical proximity fuze 10 by means of a thread or threading 17. The mortar fuze 11 is well known to those skilled in the art so that it is not described hereinafter in greater detail.

In the housing 18 of the optical proximity fuze 10, there is located at the rear, a battery 19 or other suitable power supply by means of which, among other things, the gas-pressure generating capsule 14 can be detonated. Furthermore, immediately in the front of the housing 18, there are located two transmitters, or senders 20, here optical transmitters, and two receivers or detectors or sensors 21, here optical receivers. Both transmitters or senders 20 and both receivers or detectors or sensors 21 are arranged behind one another, so that in the longitudinal sectional view of FIG. 1, only one transmitter 20 and only one receiver 21 can be seen.

Between the two transmitters 20 and the two receivers 21, on the one hand, and the battery 19, on the other hand, there is arranged an electronic device or system 22 and a switch 23. This electronic device or system 22 is hereinafter described in greater detail in conjunction with the block circuit diagram of the optical proximity fuze 10 depicted in FIG. 5. As the switch 23, there is especially provided an inertia switch which triggers or switches on the electronic device or system 22 by means of the firing or launching acceleration upon starting the mortar shell or projectile or missile or the like.

The construction and mode of operation of the transmitters 20 and the receivers 21 are hereinbelow described with reference to FIGS. 2, 3 and 4.

Figure 2:
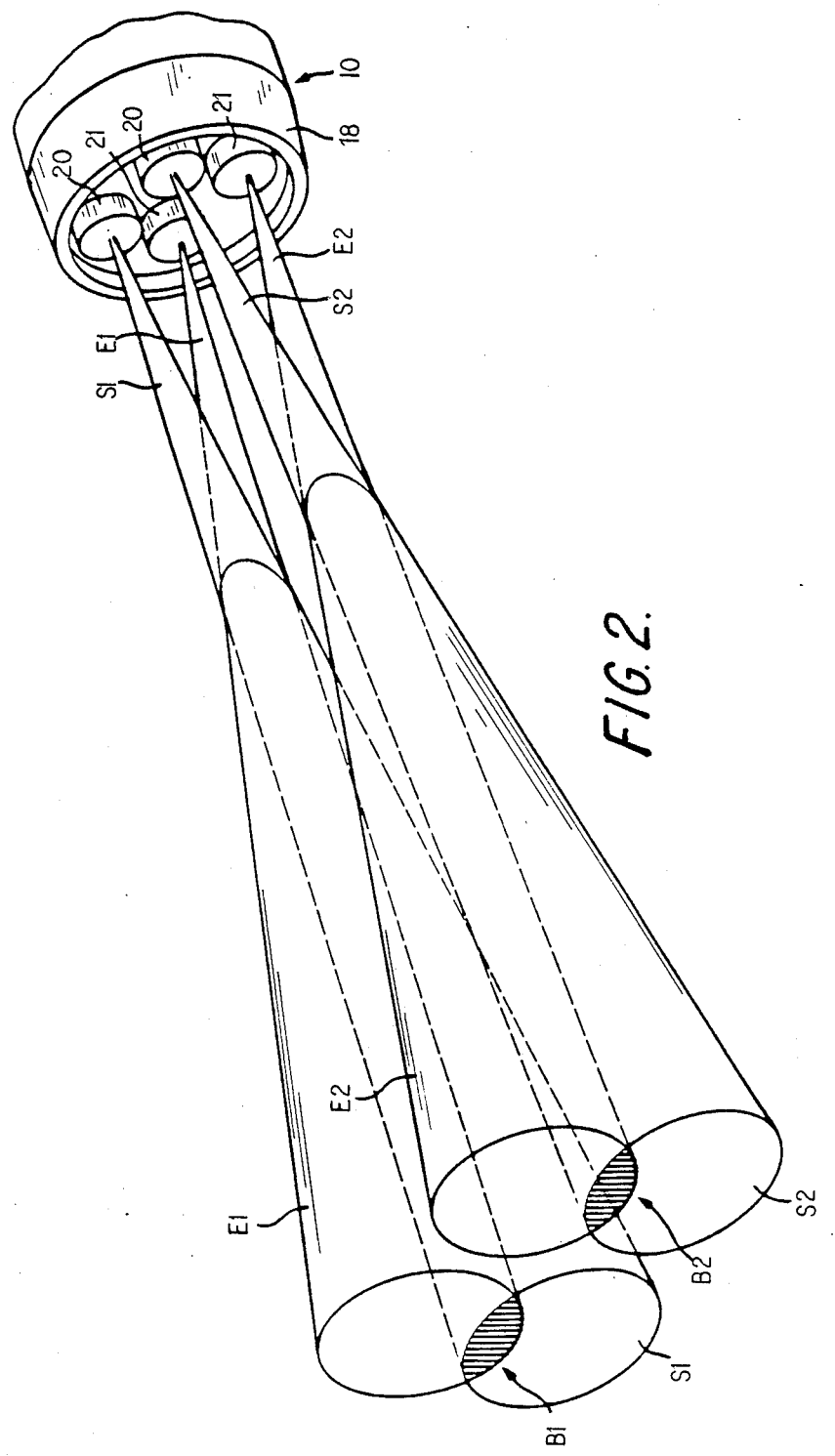
FIG. 2 is a perspective view of the beam path.

According to FIG. 2, the two transmitters 20 emit respective light cones or conical light beams S1 and S2. The two receivers 21 can detect or sense reflected light provided that such reflected light is located within respective receiving or incoming cones E1 and E2. The precise orientaton of these four cones S1, S2, E1 and E2 is clearly depicted in FIG. 2.

Figure 3:
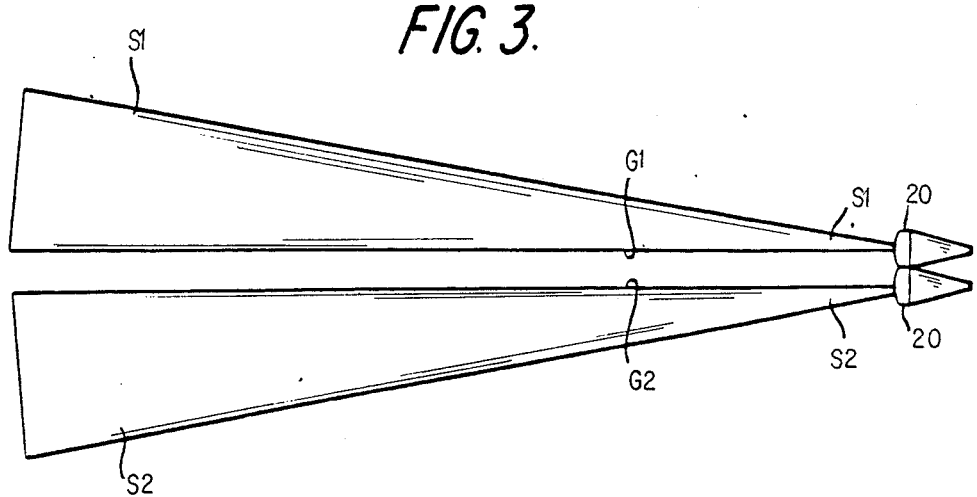
FIG. 3 is a schematic top plan view of the beam path.

According to FIG. 3, two straight generating lines G1 and G2 of the two light cones or conical light beams S1 and S2 are arranged substantially parallel to one another without the two light cones or conical light beams S1 and S2 contacting or intersecting one another.

Figure 4:
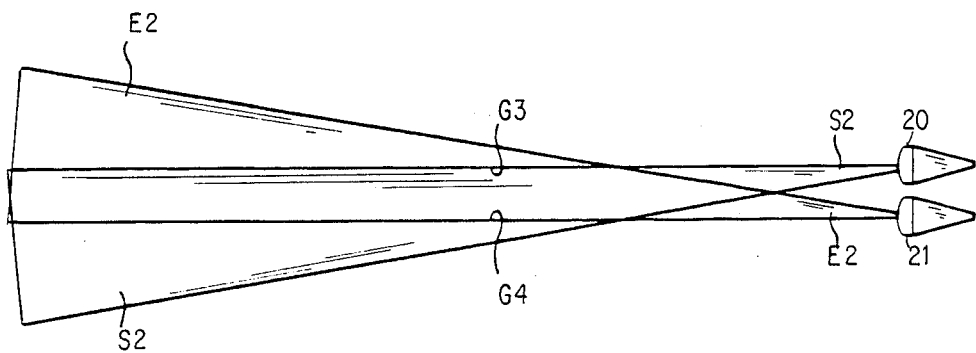
FIG. 4 is a schematic side view of the beam path.

According to FIG. 4, the one light cone or conical light beam S2 penetrates the associated receiving or incoming cone E2 and likewise two straight generating lines G3 and G4 are arranged substantially parallel to one another. A target can only be detected or sensed when, on the one hand, it is located in the light cones or conical light beams S1 and S2 and thus irradiated by the two transmitters or senders 20 and when, on the other hand, the target is simultaneously located in the receiving or incoming cones E1 and E2 and the light reflected by the target reaches the receivers or detectors 21. The corresponding intersection or overlap regions B1 and B2 of the associated cone beam pairs are illustrated by hatched or shaded lines in FIG. 2. Both receivers 21 are preferably coupled to one another in such a manner that the target can be only detected or sensed when it is located in both these regions B1 and B2. As a result, small objects, for example, rain droplets or splinters located solely in one of the two regions B1 and B2, cannot be mistaken for the target. In other words, such small objects are not detected and are thus not capable of triggering projectile or missile detonation by the optical proximity fuze 10.

Figure 5:
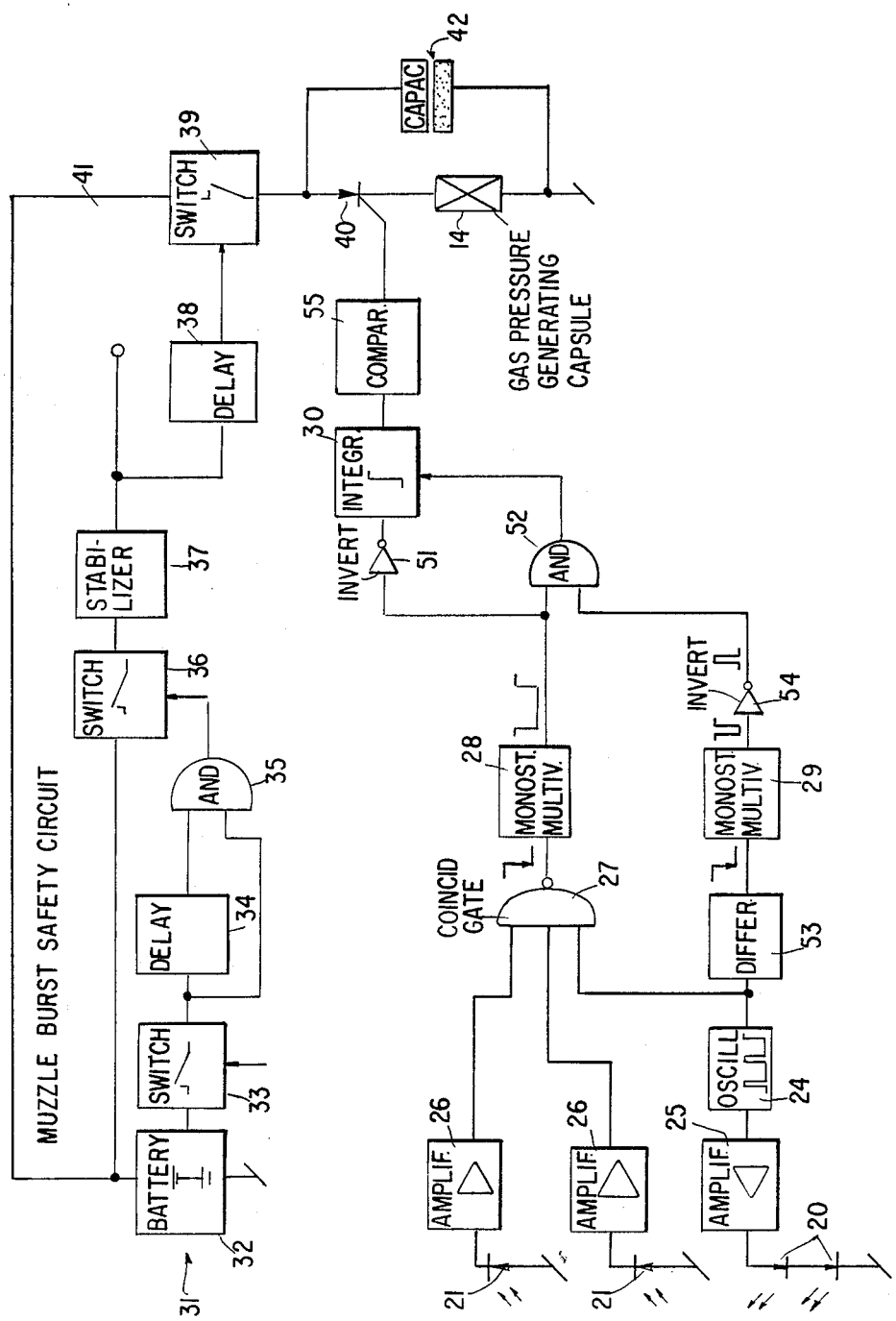
FIG. 5 shows a block circuit diagram of the optical proximity fuze.

As depicted in FIG. 5, the electronic device or system 22 of the optical proximity fuze 10 comprises a transmitter oscillator 24 which is constructed, for example, as a pulse oscillator. The pulse duration can lie in the range of, for example, 6 to 8 $\mu$s. The respective time or cycle of oscillation would then be approximately 150 $\mu$s. Between the transmitter oscillator 24 and the two transmitters or senders 20, there is arranged an amplifier 25. The pulse energy is stored in a 10 $\mu$F tantalic capacitor. Both receivers or detectors 21 are likewise connected to respective amplifiers 26. As the receivers or detectors 21, there are preferably used photodiodes which possess a high photosensitivity and a very short rise or build-up time. The signal of the receivers or photodiodes 21 operated in the non-conducting or high-resistance direction is outputted in the form of an alternating-current and amplified by approximately 80 dB by means of the amplifier 26. The two receivers 21 are connected to a coincidence gate 27 or equivalent structure by means of the two amplifiers 26. There is also provided a monostable multivibrator or monoflop 28 which is only triggered when both amplifiers 26 emit a signal of a predetermined value, for example, 3.4 volts during the transmission time of approximately 6 to 8 $\mu$s. The monostable multivibrator or monoflop 28 is connected to an integrator 30 via a parallel connection of an inverter 51 and an AND gate 52. The transmitter or pulse oscillator 24 is likewise connected to the integrator 30 via a series connection of a differentiating stage 53, a second monostable multivibrator or monoflop 29, an inverter 54 and the AND gate 52. The differentiating stage 53, as indicated, controls the second monostable multivibrator or monoflop 29 by means of the depicted negative or decreasing signal or pulse flank whereby it is ensured that no residual signal can reach the input of the integrator 30 during the active transmitting phase. The output signal originating from the first monostable multivibrator or monoflop 28 thus is present at the input of the AND gate 52 always prior to the inverted output signal originating from the second monostable multivibrator or monoflop 29. In the event that no signal arrives from the first monostable multivibrator or monoflop 28, the integrator 30 is again reset to null by means of the second monostable multivibrator or monoflop 29. The pulses of the first monostable multivibrator or monoflop 28 are accumulated in the integrator 30. Only when, for example, four pulses of the first receiver 21 and simultaneously four pulses of the second receiver 21 are accumulated in the integrator 30, the aforementioned gas-pressure generating capsule 14 receives a pulse or signal via a comparator 55 provided with an internal reference voltage such that the detonation is accomplished and the ignition or firing pin 13 (cf. FIG. 1) is actuated. In order to ensure muzzle burst safety, there is provided a muzzle burst safety circuit 31. This muzzle burst safety circuit 31 contains a power supply like, for example, a battery 32 which is connected to a switch 33. The switch 33, in turn, is connected to a delay element 34 and to one input of an AND gate 35 having a second input which is connected to the output of the delay element 34. The output of the AND gate 35 is connected to a switch 36 which in its closed condition connects the power supply or battery 32 to a stabilizer 37. A further delay element 38 is connected to a further switch 39. The further switch 39 is connected on its input side to the power supply or battery 32 by means of a line or conduit 41. Upon closing of the further switch 39, the power supply or battery 32 is connected to a capacitor 42 which is charged in the closed state of the further switch 39 and connected to a thyristor 40. There can thus be produced the aforementioned pulse or signal for detonating the gas pressure generating capsule 14 in order to thereby actuate the firing pin 13.

Having now had the benefit of the foregoing discussion of the exemplary embodiment of optical proximity fuze, its mode of operation is hereinafter described and is as follows:

Upon firing the mortar shell or projectile or missile or the like, the optical proximity fuze 10 is switched on. The two transmitters or senders 20 pulsatingly radiate a light beam which, as already mentioned, possesses a pulse duration of approximately 6 to 8 $\mu$s and a time or cycle of oscillation of approximately 150 $\mu$s. The wavelength of such a light beam lies preferably in the infrared range. In this manner, a target is detected or sensed when the following conditions are fulfilled:

1. The target must appear in both regions B1 and B2 shown in FIG. 2; and

2. The target must dwell in these two regions B1 and B2 for a certain length of time in order that several light pulses of the two transmitters or senders 20 can be reflected to their respective receiver or detector 21. For example, at least four pulses must be reflected from each of the two regions B1 and B2 in order that detonation can be effected.

In this manner, there exists only a small probability that in both regions B1 and B2 rain drops or other small particles can simultaneously appear and which rain drops or the like can be detected in both regions B1 and B2 chronologically four times in succession.

An essential advantage of the inventive optical proximity fuze 10 resides in the fact that the overlap or overlapping regions B1 and B2 do not diverge in contrast to the light cones or conical light beams S1 and S2, so that the size of the regions B1 and B2 is independent of the distance of the projectile or missile of the like from the target.

Instead of the two described transmitters 20 and the two receivers 21, there can be arranged further transmitters and receivers within the housing 12.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. An optical proximity fuze for detonating a projectile or the like at a predetermined distance from a target, comprising:

at least two optical transmitters each of which emits an associated beam towards a target;

at least two optical receivers each of which is arranged in cooperating relationship with an associated one of the at least two optical transmitters;

each optical receiver receiving at least part of the beam emitted by the associated optical transmitter and reflected at the target;

each of said at least two optical receivers delivering a signal to detonate the projectile upon reception of said beam reflected at said target;

said two optical receivers measuring target distance in several chronological measurements; and means for detonating the projectile only when said two optical receivers simultaneously respond.

2. The optical proximity fuze as defined in claim 1, wherein:

said at least two optical transmitters each generate as the associated beam a cone of light;

said at least two optical receivers each having a receiving cone in which said two optical receivers detect the cones of light reflected by the target; and said cone of light and said receiving cone of each associated transmitter and receiver overlapping solely in one region in which said target can be detected by said at least two optical receivers.

3. The optical proximity fuze as defined in claim 2, wherein:

said at least two optical transmitters constitute first and second optical transmitters;

said at least two optical receivers constitute first and second optical receivers;

said first optical transmitter and said first optical receiver forming a first region;

said second optical transmitter and said second optical receiver forming a second region;

said first and second regions being non-overlapping; and said target to be detected having to be located in said first and second regions in order to be detected.

* * * * *